(12) United States Patent
Han et al.

(10) Patent No.: US 12,001,651 B2
(45) Date of Patent: Jun. 4, 2024

(54) METHOD, DEVICE, AND NON-TRANSITORY COMPUTER-READABLE RECORDING MEDIUM FOR BROWSING VARIOUS STICKER CONTENTS THROUGH SWIPE-TO-PREVIEW INTERFACE

(71) Applicant: LINE Plus Corporation, Seongnam-si (KR)

(72) Inventors: Soyeon Han, Seongnam-si (KR); Hyun Ju Yi, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 18/049,395

(22) Filed: Oct. 25, 2022

(65) Prior Publication Data

US 2023/0134831 A1 May 4, 2023

(30) Foreign Application Priority Data

Nov. 1, 2021 (KR) .......................... 10-2021-0147807

(51) Int. Cl.
*G06F 3/0482* (2013.01)
*G06F 3/04845* (2022.01)
*G06F 3/0485* (2022.01)
*G06F 3/0488* (2022.01)

(52) U.S. Cl.
CPC ........ *G06F 3/0482* (2013.01); *G06F 3/04845* (2013.01); *G06F 3/0485* (2013.01); *G06F 3/0488* (2013.01)

(58) Field of Classification Search
CPC .. G06F 3/0482; G06F 3/0481; G06F 3/04845; G06F 3/0484; G06F 3/0485; G06F 3/0488; G06F 3/0487

USPC .......................................................... 715/784
See application file for complete search history.

(56) References Cited

U.S. PATENT DOCUMENTS

| | | | | |
|---|---|---|---|---|
| 9,529,509 | B1 * | 12/2016 | Schmidt ................ | G06F 3/0485 |
| 2008/0189659 | A1 * | 8/2008 | Krutzler ............... | G06F 16/958 |
| | | | | 715/838 |
| 2011/0016423 | A1 * | 1/2011 | Brubaker ............. | G06F 3/0481 |
| | | | | 715/788 |
| 2011/0254865 | A1 * | 10/2011 | Yee ...................... | G06F 3/04886 |
| | | | | 345/661 |
| 2012/0210200 | A1 * | 8/2012 | Berger ................. | G06F 3/0481 |
| | | | | 715/202 |
| 2016/0188181 | A1 * | 6/2016 | Smith ................ | G06F 3/04886 |
| | | | | 715/765 |
| 2016/0291822 | A1 * | 10/2016 | Ahuja .................... | H04L 51/52 |

(Continued)

FOREIGN PATENT DOCUMENTS

KR     10-2002-0074304 A     9/2002

*Primary Examiner* — Hwei-Min Lu
(74) *Attorney, Agent, or Firm* — Harness, Dickey & Pierce, P.L.C.

(57) ABSTRACT

Methods, devices, and non-transitory computer-readable recording mediums for browsing various sticker contents through swipe to preview may be provided. A sticker content browsing method performed by a computer device, which includes at least one processor configured to execute computer-readable instructions included in a memory, including providing a swipe-to-preview interface configured to enable a user to scroll sticker contents and displaying a subset of the sticker contents in response to a control instruction of the user input to the swipe-to-preview interface.

19 Claims, 9 Drawing Sheets

(56) References Cited

U.S. PATENT DOCUMENTS

| | | | | |
|---|---|---|---|---|
| 2017/0010771 | A1* | 1/2017 | Bernstein | G09G 5/12 |
| 2017/0031550 | A1* | 2/2017 | Shaffer | H04L 51/52 |
| 2018/0083898 | A1* | 3/2018 | Pham | H04L 51/046 |
| 2020/0358726 | A1* | 11/2020 | Dryer | H04L 51/046 |
| 2022/0030299 | A1* | 1/2022 | Aher | H04N 21/4858 |
| 2022/0083206 | A1* | 3/2022 | Park | G06F 3/04845 |
| 2022/0198125 | A1* | 6/2022 | Cha | H04L 51/046 |
| 2022/0301232 | A1* | 9/2022 | Park | G06F 18/2431 |

* cited by examiner

METHOD, DEVICE, AND NON-TRANSITORY COMPUTER-READABLE RECORDING MEDIUM FOR BROWSING VARIOUS STICKER CONTENTS THROUGH SWIPE-TO-PREVIEW INTERFACE

CROSS-REFERENCE TO RELATED APPLICATION(S)

This U.S. non-provisional application claims the benefit of priority under 35 U.S.C. § 119 to Korean Patent Application No. 10-2021-0147807, filed Nov. 1, 2021, the entire contents of which are incorporated herein by reference in their entirety.

BACKGROUND

Technical Field

Some example embodiments relate to user interfaces (UI) for browsing sticker contents.

Related Art

An instant messenger is a general communication tool and refers to software capable of transmitting and receiving messages or data in real time. A user may register a contact on a messenger and may send and receive messages with a counterpart on a contact list in real time. Due to such a messenger function, the messenger is commonly used in a mobile environment of a mobile communication terminal as well as in a personal computer (PC).

Currently, delivering a message using a sticker in a form of a graphic image is popular. In response to a specific keyword input from a user, a sticker corresponding to the specific keyword is automatically converted and delivered as a message through the sticker.

However, a path capable of browsing other contents in a preview is not provided before transmitting a sticker within a messenger. Therefore, there is no way for a user to take an action within the preview and the user may simply close the corresponding preview or transmit a message.

SUMMARY

Some example embodiments may provide a swipe-to-preview interface for browsing sticker contents.

Some example embodiments may provide methods and/or systems that may browse other sticker contents through a mobile gesture within a swipe-to-preview interface.

According to an aspect of at least one example embodiment, there may be provided a sticker content browsing method performed by a computer device including at least one processor configured to execute computer-readable instructions included in a memory. The sticker content browsing method may include, by the at least one processor, providing a swipe-to-preview interface configured to enable a user to scroll sticker contents, and displaying a subset of the sticker contents in response to a control instruction of the user input to the swipe-to-preview interface.

The displaying may include displaying the subset of the sticker contents on the swipe-to-preview interface according to an order logic of sticker contents configured in relation to a keyword input from the user.

The displaying may include, in response to a selection of one sticker content the subset of the configured sticker contents, displaying a previous sticker content of the selected one sticker content, the selected one sticker content, and a subsequent sticker content of the selected one sticker content in order on the swipe-to-preview interface.

The displaying may include receiving swipe information as the control instruction of the user to the sticker contents displayed on the swipe-to-preview interface.

The displaying may include moving a location of the sticker contents according to the received swipe information and displaying corresponding sticker contents at the moved location.

The displaying may include displaying a specific one of the subset of the sticker contents that is positioned at the center of the swipe-to-preview interface to be highlighted rather than one or more of the subset of the sticker contents that are positioned around the swipe-to-preview interface.

The providing may include, in response to a selection on one sticker content among sticker contents configured in relation to a keyword input from the user, providing the swipe-to-preview interface.

The displaying may include adjusting a size of the swipe-to-preview interface based on a type of a specific sticker content moved according to the received swipe information.

The type of sticker content may include a first sticker content not including a text or an action, a second sticker content including a text, or a third sticker content including an action, and the displaying may include setting the size of the swipe-to-preview interface to be maintained when the type of sticker content is the first sticker content or the second sticker content, t and setting the size of swipe-to-preview interface to expand by assigning an expansion effect to the swipe-to-preview interface when the type of sticker content is the sticker content including the action.

The displaying may include dynamically expanding the swipe-to-preview interface by size information set to correspond to a size of the specific sticker content including an action when the type of the specific sticker content is a sticker content including the action.

The displaying may include moving the sticker contents by applying a browsing speed of the sticker contents according to strength of the received swipe information.

The displaying may include, in a case that the subset of the sticker contents including a specific sticker content including a text, displaying the sticker content including the text to be smaller than one or more other sticker contents included in the subset of the sticker contents.

The displaying may include, in response to sound being included in the sticker contents, providing a user interface configured to enable ON/OFF of the sound.

The displaying may include, in response to double tap information being input as the control instruction of the user at a central area of the swipe-to-preview interface, transmitting sticker content selected by the user.

The displaying may include, in response to double tap information being input as the control instruction of the user at a central area of the swipe-to-preview interface, moving sticker contents configured in relation to a keyword input from the user to a specific area.

According to an aspect of at least one example embodiment, there is provided a non-transitory computer-readable recording medium storing instructions that when executed by a processor, cause a computer device to perform the sticker content browsing method.

According to an aspect of at least one example embodiment, there is provided a computer device including at least one processor configured to execute computer-readable instructions included in a memory. The at least one processor is configured to provide a swipe-to-preview interface configured to enable a user to scroll sticker contents, and to display a subset of the sticker contents in response to a control instruction of the user input to the swipe-to-preview interface.

The at least one processor may be configured to receive swipe information as the control instruction of the user to the sticker contents displayed on the swipe-to-preview interface and to display corresponding sticker contents at a location moved according to the received swipe information.

The at least one processor may be configured to adjust a size of the swipe-to-preview interface based on a type of sticker content corresponding to a location moved according to the received swipe information.

When the type of sticker content is a sticker content including an action, the at least one processor may be configured to dynamically expand the swipe-to-preview interface by size information set to correspond to a size of the sticker content including the action.

According to some example embodiments, it is possible to provide a user interface capable of more quickly browsing a sticker through a change to a scroll method.

According to some example embodiments, it is possible to improve a browsing speed through a change from a method of viewing sticker content per page to a method of viewing sticker content using a scroll.

According to some example embodiments, it is possible to browse sticker contents in more detail and slowly while swiping on a preview screen.

According to some example embodiment, it is possible to browse various recommended stickers on a preview screen through a swipe without a need to going back to a list to view other stickers.

Further areas of applicability will become apparent from the description provided herein. The description and specific examples in this summary are intended for purposes of illustration only and are not intended to limit the scope of the present disclosure.

DETAILED DESCRIPTION

Figure 1:
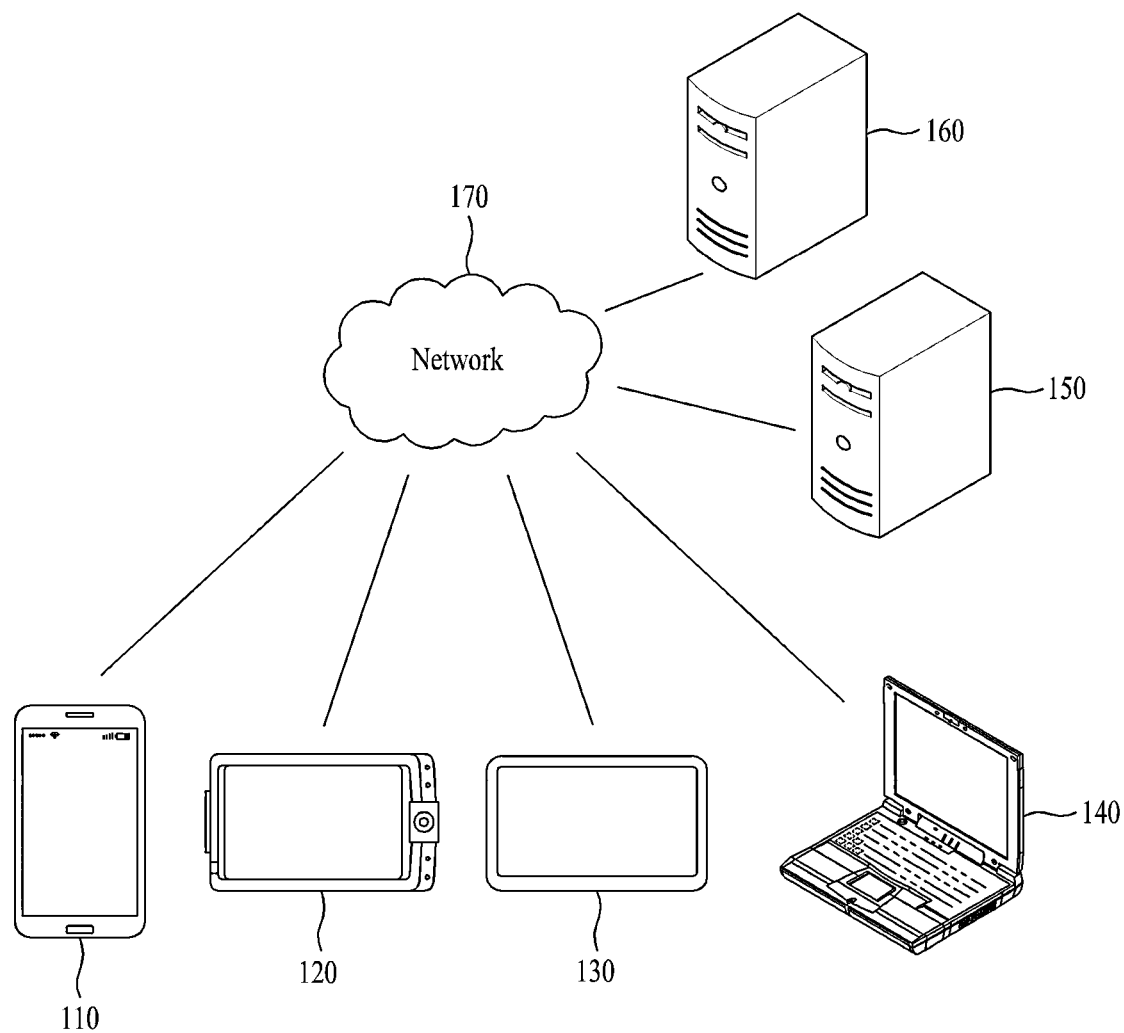
FIG. 1 is a diagram illustrating an example of a network environment according to at least one example embodiment.

One or more example embodiments will be described in detail with reference to the accompanying drawings.

Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Such example embodiments relate to a user interface for browsing sticker contents. A swipe-to-preview interface enables a user to browse various sticker contents through a simple gesture.

A sticker content browsing system according to some example embodiments may be implemented by at least one computer device. A sticker content browsing method according to some example embodiments may be performed by at least one computer device included in the sticker content browsing system. Here, a computer program according to an example embodiment may be installed and run on the computer device and the computer device may perform the sticker content browsing method according to some example embodiments under control of the computer program. The aforementioned computer program may be stored in a non-transitory computer-readable recording medium to implement the sticker content browsing method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. The network environment of FIG. 1 is provided as one example of environments and environments applicable to example embodiments are not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a content browsing service, to the plurality of electronic devices 110, 120, 130, and 140 connected over the network 170.

Figure 2:
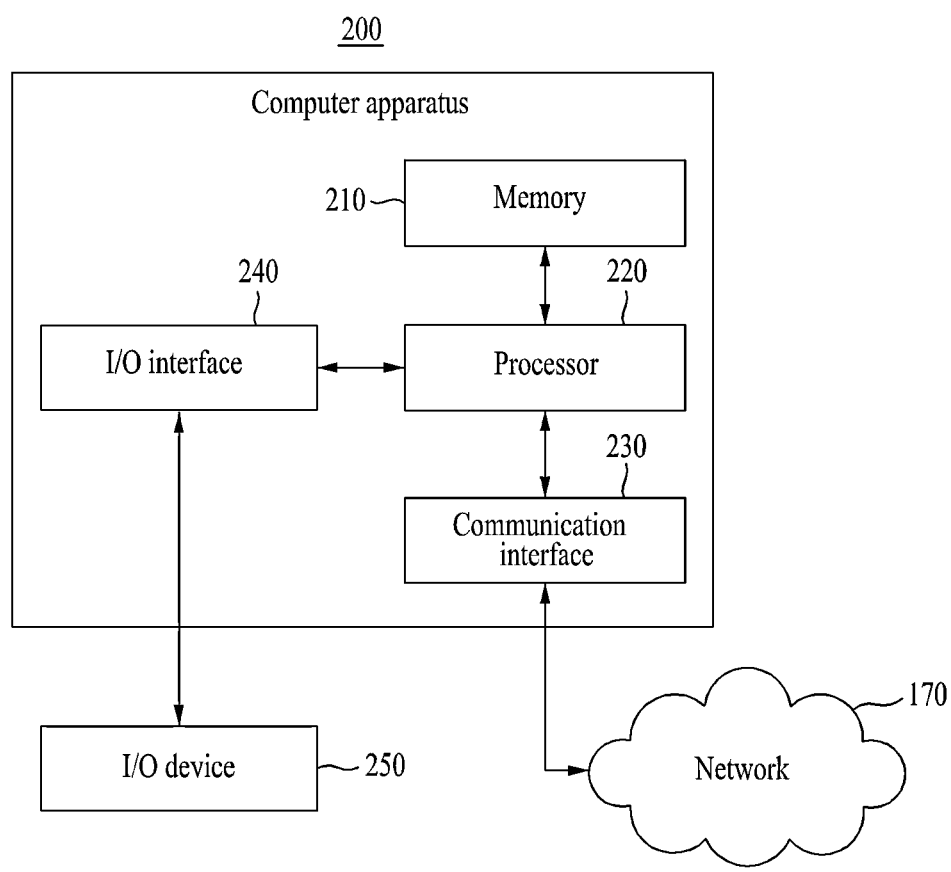
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. A signal, an instruction, data, etc., received through the communication interface 230 may be forwarded to the processor 220 or the memory 210, and a file, etc. may be stored in a storage medium, for example, the permanent storage device, further includable in the computer device 200.

The I/O interface 240 may be a device used for interfacing with an I/O device 250. For example, an input device may include a device, such as a microphone, a keyboard, and a mouse, and an output device may include a device, such as a display and a speaker. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, a method and apparatus for providing an interface for sticker content browsing according to some example embodiments will be described. Here, the term "sticker content" may correspond to, for example, an emoji, a sticker, and an emoticon, and may be configured in a two-dimensional (2D) form or a three-dimensional (3D) form that includes sound, movement, and the like.

In an example embodiment, a swipe-to-preview interface may operate in a message transmission and reception service (e.g., an instant messaging service, a social network service, etc.). For example, the swipe-to-preview interface may be a function provided for browsing sticker contents on a preview screen provided in a preview form for transmitting sticker content to a chatroom in the message transmission and reception service.

Figure 3:
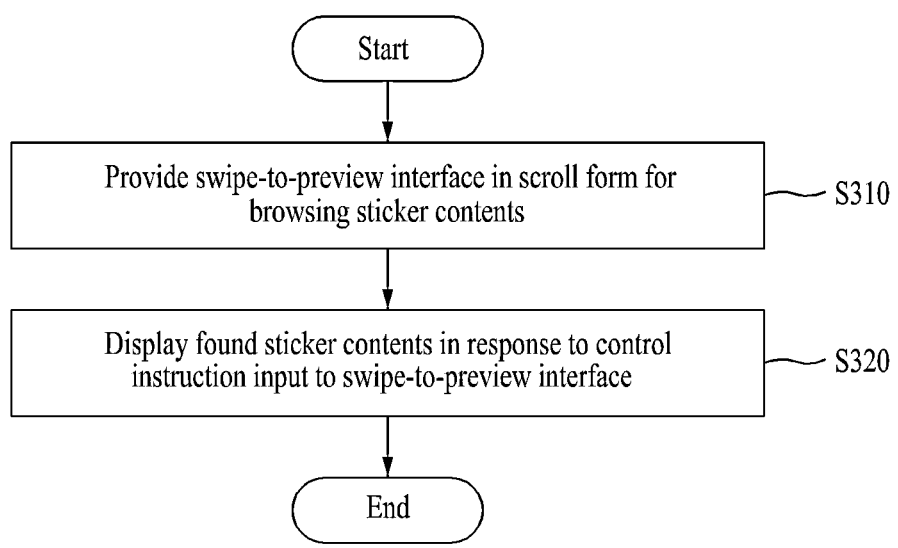
FIG. 3 is a flowchart illustrating an example of a method performed by a computer device according to at least one example embodiment.

FIG. 3 is a flowchart illustrating an example of a method performed by a computer device according to at least one example embodiment.

The computer device 200 according to the example embodiment may provide a client with a sticker content browsing service through connection to an exclusive application installed on the client or a website/mobile site related to the computer device 200. A sticker content browsing system implemented on a computer may be configured in the computer device 200. For example, the sticker content browsing system may be implemented in a form of a program that independently operates or may be configured in an in-app form of a specific application to be operable on the specific application.

Referring to FIG. 3, the processor 220 of the computer device 200 may be configured as a component to perform the following sticker content browsing method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations S310 and S320 included in the following sticker content browsing method of FIG. 3. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a instruction from the memory 210 to which instructions related to control of the computer device 200 are loaded. In this case, the read instruction may include an instruction for controlling the processor 220 to perform the following operations S310 and S320.

Referring to FIG. 3, in operation S310, the processor 220 may provide a swipe-to-preview interface in a scroll form for browsing sticker contents. In response to a selection on one sticker content among sticker contents configured in relation to a keyword input from a user, the processor 220 may provide the swipe-to-preview interface in the scroll form for browsing the sticker contents. Here, the swipe-to-preview interface may be provided to receive control infor-mation of the user and to enable the user to browse the sticker contents in the scroll form.

Figure 4:
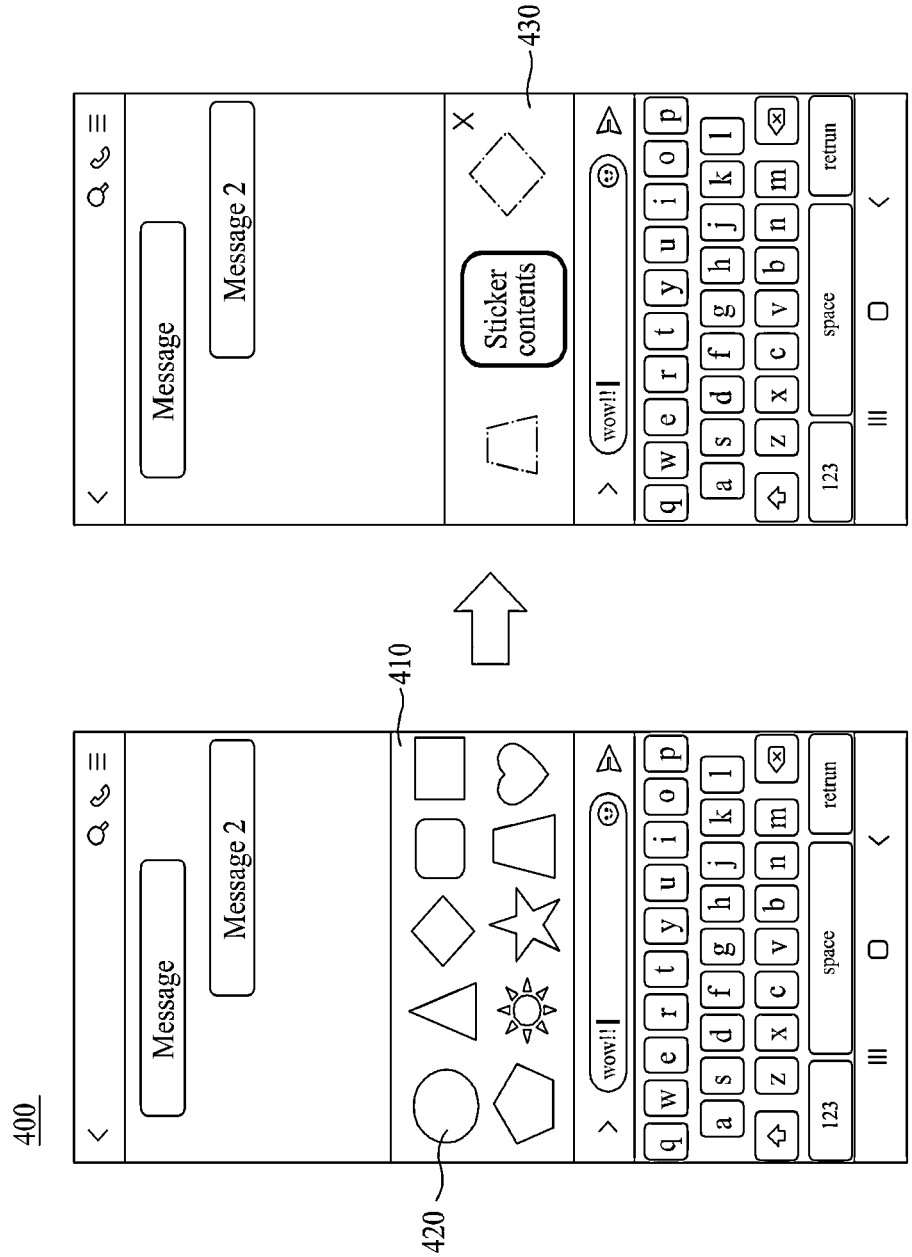
FIG. 4 illustrates an example of an operation of providing a swipe-to-preview interface according to at least one example embodiment.

FIG. 4 illustrates an example of an operation of providing a swipe-to-preview interface according to at least one example embodiment. The processor 220 may configure sticker contents related to a keyword (e.g., wow!!) input from the user in an auto-suggestion area 410. The auto-suggestion area 410 represents an area for providing the sticker contents configured in relation to the keyword input from the user. For example, in relation to the keyword input from the user, sticker contents including (1) sticker content basically provided from a message transmission and reception service 400, (2) recommended sticker content for encouraging the user to purchase, (3) free trial sticker content that induces purchase through trial of the user, (4) free sticker content, (5) sticker content already purchased, and (6) sticker content with a desired (or alternatively, preset) size or more may be configured, and the configured sticker contents may be provided in the auto-suggestion area 410.

A control instruction of the user may be input to the auto-suggestion area 410 or sticker content configured in the auto-suggestion area 410. For example, a touch of the user may be input to a partial area of the auto-suggestion area 410, or one sticker content 420 among the sticker contents configured in the auto-suggestion area 410 may be selected by the user.

In response to the control instruction of the user being input to the auto-suggestion area 410 or the one sticker content 420 among the sticker contents configured in the auto-suggestion area 410, the processor 220 may provide a swipe-to-preview interface 430 in a scroll form for browsing sticker contents.

For example, sticker contents may be displayed on the swipe-to-preview interface 430 based on the sticker content 420 selected by the user from among the sticker contents configured in the auto-suggestion area 410. The processor 220 may display the swipe-to-preview interface 430 with previous sticker content of selected sticker content and subsequent sticker content of the selected sticker content based on the selected sticker content. Here, when the sticker contents are positioned at the center of the swipe-to-preview interface 430, the sticker contents may be highlighted to be larger and darker than when the sticker contents are positioned as sides of the swipe-to-preview interface 430. Also, a user interface for terminating the swipe-to-preview interface 430 as well as the sticker contents may be displayed on the swipe-to-preview interface 430.

Figure 5:
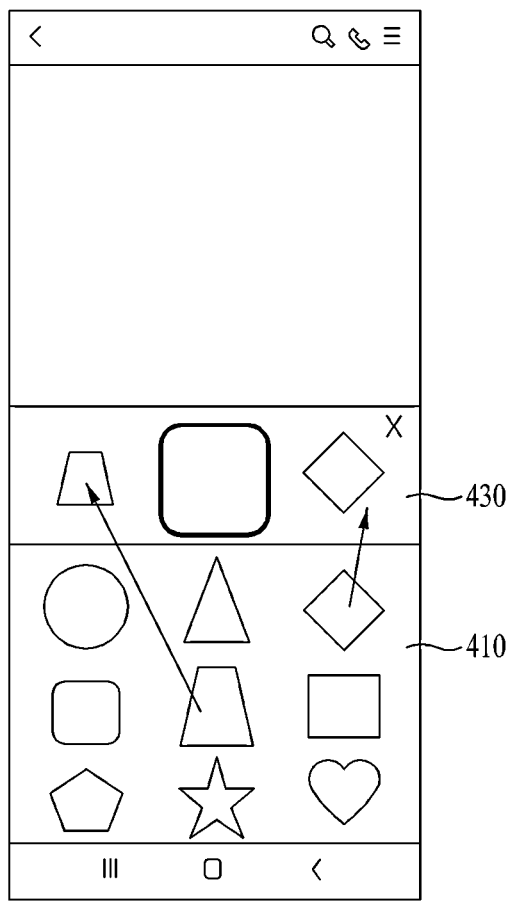
FIG. 5 illustrates an example of an operation of configuring sticker contents in a swipe-to-preview interface according to at least one example embodiment.

The processor 220 may display the sticker contents on the swipe-to-preview interface 430 according to an order logic of the sticker contents configured in the auto-suggestion area 410. FIG. 5 illustrates an example of an operation of configuring sticker contents in a swipe-to-preview interface according to at least one example embodiment. The order logic represents ordering the configured sticker contents based on a keyword input from the user. The order logic may be determined based on data accumulated from the user. Although the same keyword is input from users, order of sticker contents and stickers displayed on the swipe-to-preview interface 430 may differ for each user. The order logic may determine the order of sticker contents through analysis of, for example, user identification information that includes an age and a gender of the user, sticker interest/preference of the user, a sticker use ratio of the user, an OS of an electronic device used by the user, and identification information of the electronic device.

In operation S320, the processor 220 may display the found sticker contents in response to a control instruction input to the swipe-to-preview interface. The processor 220 may display the sticker contents on the swipe-to-preview interface according to an order logic of sticker contents configured in relation to a keyword input from the user.

Figure 6:
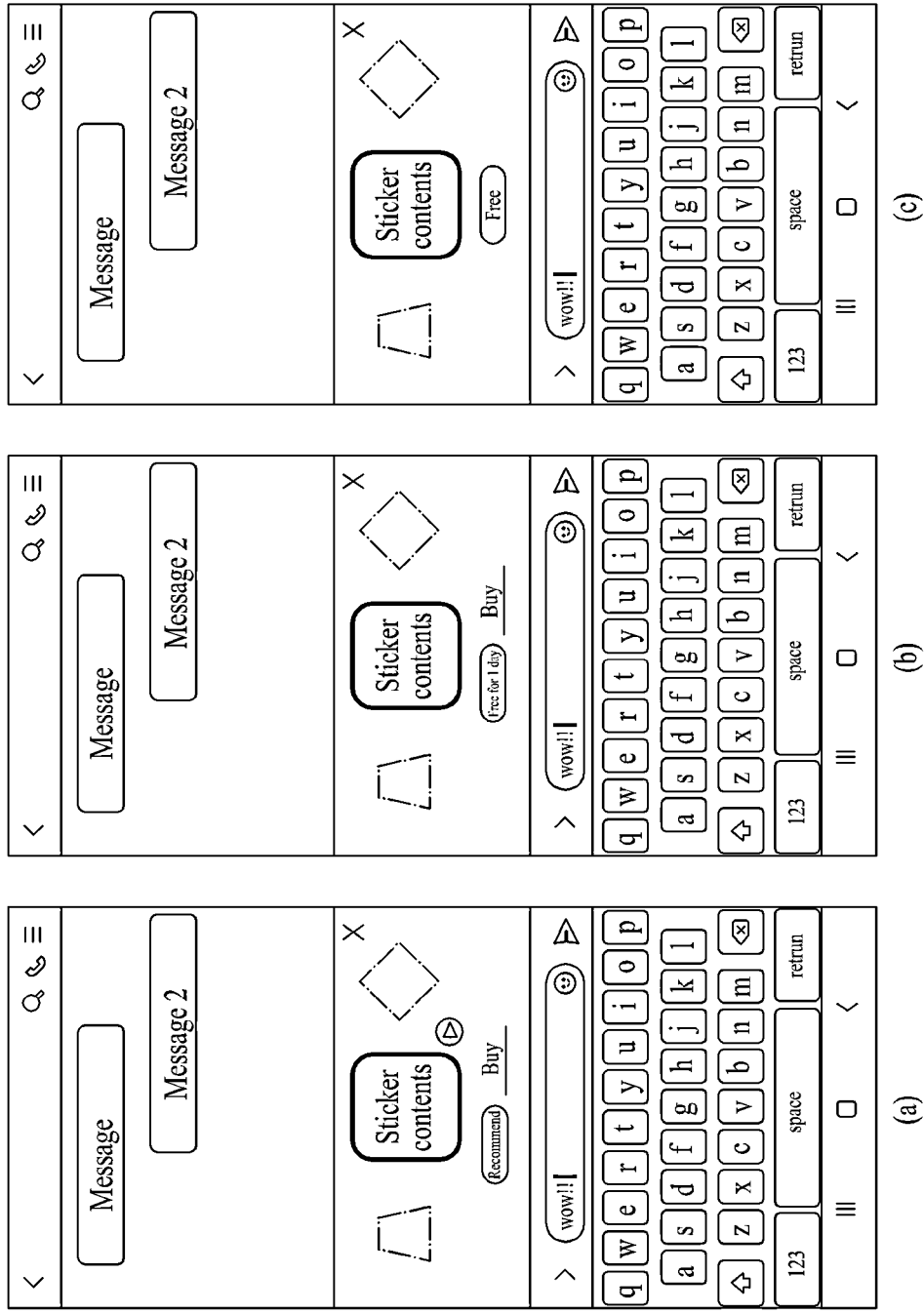
FIGS. 6 and 7 illustrate examples of an operation of displaying sticker contents on a swipe-to-preview interface according to at least one example embodiment.
Figure 7:
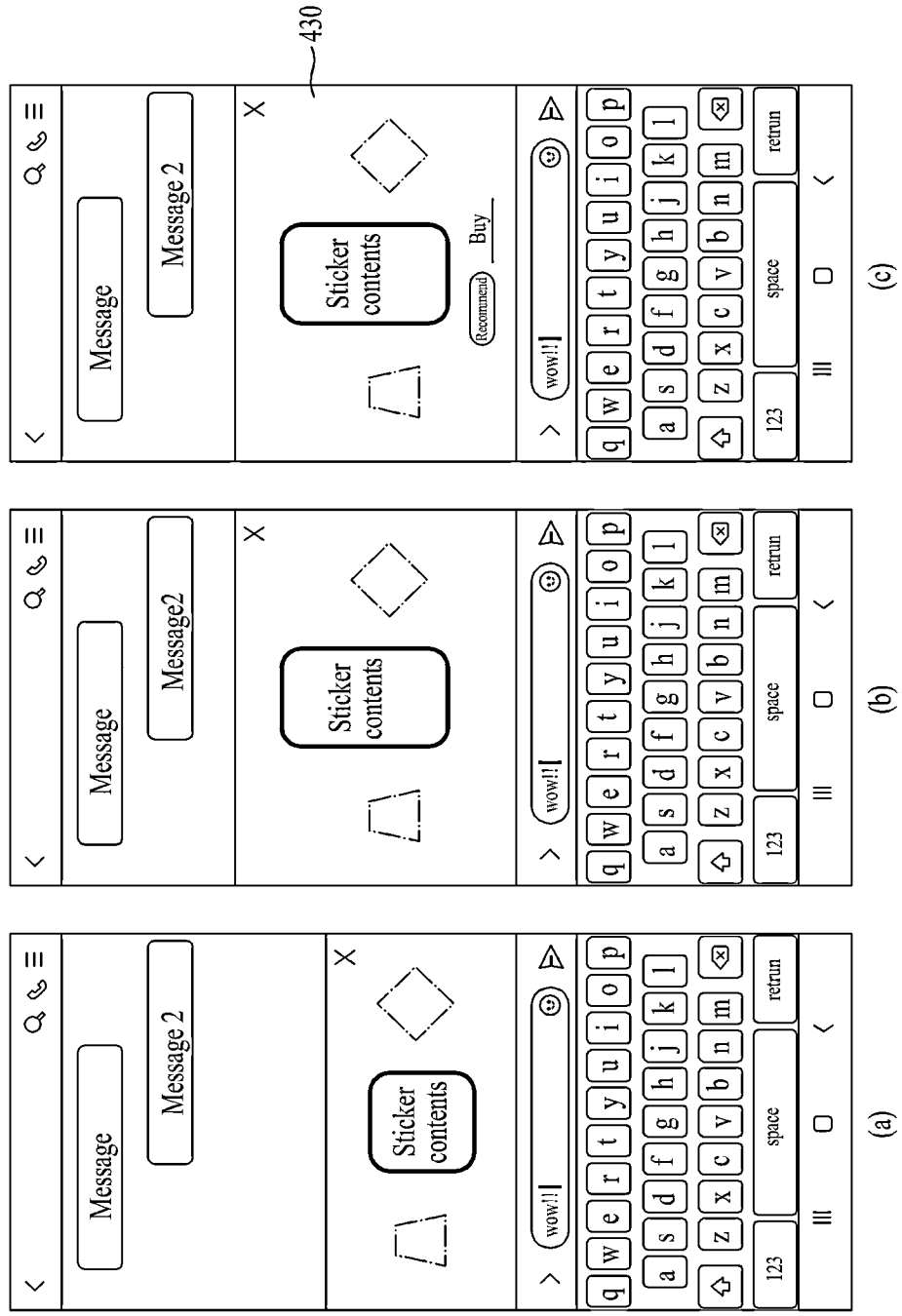

FIGS. 6 and 7 illustrate examples of an operation of displaying sticker contents on a swipe-to-preview interface according to at least one example embodiment. The processor 220 may differently display the sticker contents on a swipe-to-preview interface based on a type of sticker content. The type of sticker content may include sticker content including a text and sticker content including an action. For example, in the case of the sticker content including the text, the processor 220 may display the sticker content including the text to be smaller than other sticker contents on the swipe-to-preview interface.

Referring to (a) of FIG. 6, recommended sticker content may be displayed on the swipe-to-preview interface. The recommended sticker content represents sticker content recommended to induce the user to purchase. The swipe-to-preview interface may provide a "Buy" user interface with an indication of "Recommend" for the recommended sticker content. The "Buy" user interface is provided such that a user desiring to purchase may move to a corresponding purchase site and may purchase the recommended sticker content.

Referring to (b) of FIG. 6, free trial sticker content may be displayed on the swipe-to-preview interface. The free trial sticker content represents sticker content that provides a free trial available for free for one day to induce the user to purchase. The swipe-to-preview interface may provide a "Buy" user interface with an indication of "Free for 1 day" for the free trial sticker content. The "Buy" user interface is provided such that a user desiring to purchase may move to a corresponding purchase site and may purchase the free trial sticker content.

Referring to (c) of FIG. 6, free sticker content may be displayed on the swipe-to-preview interface. The free sticker content represents sticker content provided for free to the user. The swipe-to-preview interface may display an indication of "Free" for the free sticker content.

Referring to (a) of FIG. 7, sticker content provided from a message transmission and reception service may be displayed on the swipe-to-preview interface. The sticker content provided from the message transmission and reception service represents free sticker content that is basically provided to all users from the message transmission and reception service. In some example embodiments, already purchased sticker content may be displayed on the swipe-to-preview interface. The already purchased sticker content represents sticker content as to which payment is completed by the user to use the sticker content.

For example, it is assumed that the same sticker content is used in (a), (b), and (c) of FIG. 6 and (a) of FIG. 7. When a text is added to the same sticker content, the sticker content of (a), (b), (c) of FIG. 6 to which the text is added may be displayed to be smaller than the sticker content of (a) of FIG. 7 on the swipe-to-preview interface.

Referring to (b) of FIG. 7, sticker content with a desired (or alternatively, preset) size or more may be displayed on the swipe-to-preview interface. The sticker content with the desired (or alternatively, preset) size or more represents sticker content with a larger size than that of general sticker content. For example, the sticker content with the desired (or alternatively, preset) size or more may include sticker content that includes an action.

Referring to (c) of FIG. 7, sticker content with a desired (or alternatively, preset) size or more may be displayed on the swipe-to-preview interface. The sticker content with the desired (or alternatively, preset) size or more represents large-sized sticker content recommended to induce the user to purchase. The swipe-to-preview interface may provide a "Buy" user interface with an indication of "recommend" for the sticker content with the desired (or alternatively, preset) size or more. The "Buy" user interface is provided such that a user desiring to purchase may move to a corresponding purchase site and may purchase the sticker content with the preset size or more.

Referring to (b) and (c) of FIG. 7, when a text is added even to the same sticker contents each with the desired (or alternatively, preset) size or more, the sticker content with the desired (or alternatively, preset) size or more in (b) of FIG. 7 may be displayed to be smaller than the sticker content with the desired (or alternatively, preset) size or more to which the text is applied in (c) of FIG. 7 on the swipe-to-preview interface.

Also, the sticker contents described in FIGS. 6 and 7 may be configured to output sound. A user interface (not shown) for ON/OFF of sound may be provided on the swipe-to-preview user interface. The user may listen to the sound of sticker contents using the user interface for ON/OFF of sound.

Figure 8:
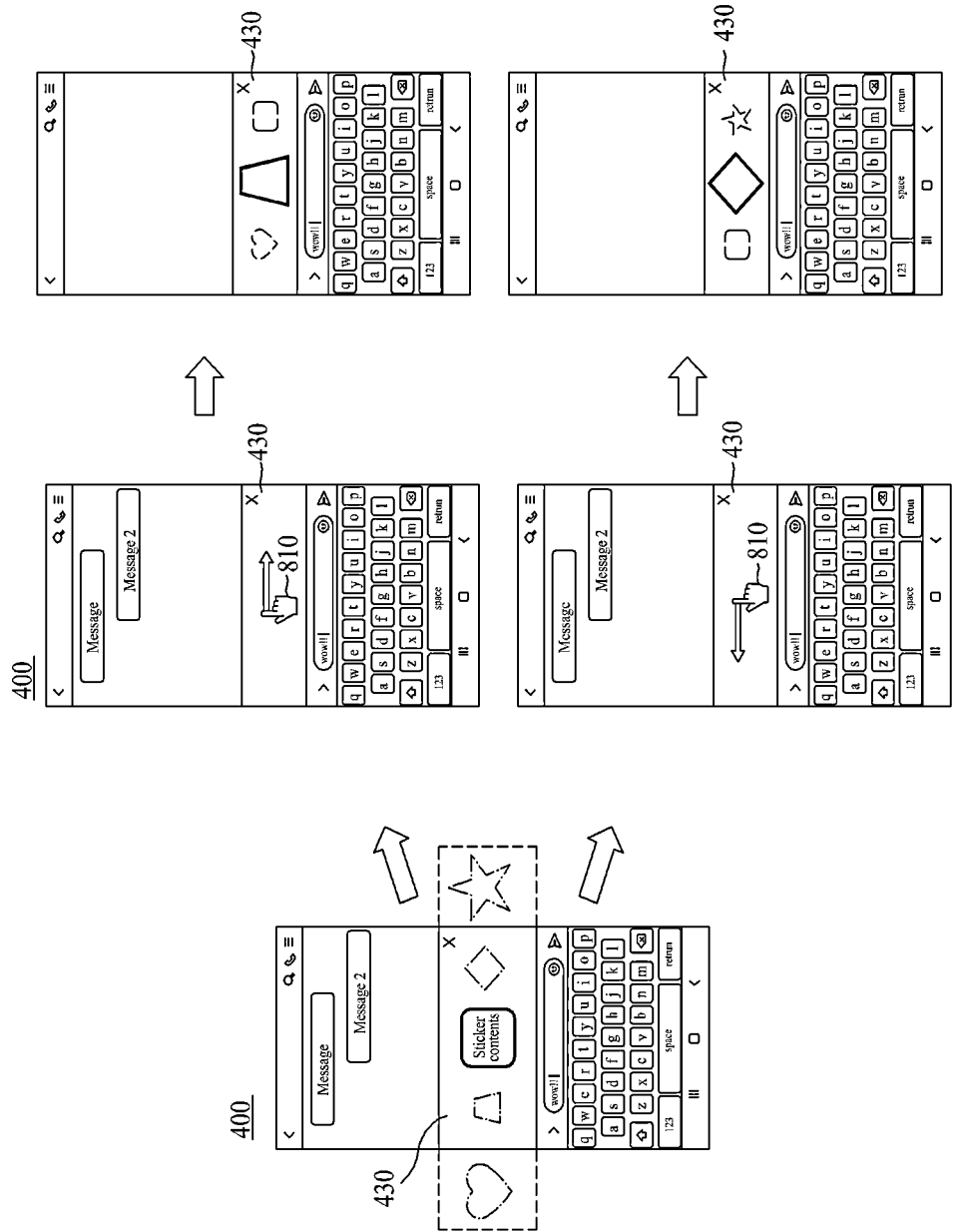
FIG. 8 illustrates an example of an operation of browsing sticker contents in response to a control instruction of a user according to at least one example embodiment.

FIG. 8 illustrates an example of an operation of browsing sticker contents in response to a control instruction of a user according to at least one example embodiment. The control instruction may be input from the user to sticker contents displayed on the swipe-to-preview interface 430. Control information of the user refers to mobile gesture information that includes a tap, a split tap, a flick, and a swipe and represents inputting an instruction using a finger on a touchscreen. For example, gestures of using five fingers starting from a single finger may be present. A tap gesture refers to tapping a touchscreen of an electronic device with a finger, a split tap gesture refers to tapping with one finger on the touchscreen first and then another finger, a flick gesture refers to softly flicking a finger left/right and up/down, and a swipe gesture refers to swiping the touchscreen longer than the flick. Here, the flick gesture on the swipe-to-preview interface also could be referred to as the swipe gesture.

The processor 220 may receive swipe information as the control instruction of the user. The processor 220 may move a location of sticker contents based on the received swipe information and may display corresponding sticker contents at the moved location. When the sticker contents corresponding to the moved location are positioned at the center of the swipe-to-preview interface 430, the sticker contents may be highlighted to be larger and darker than when the sticker contents are positioned at sides of the swipe-to-preview interface 430. For example, when three sticker contents are displayed on the swipe-to-preview interface 430, the sticker content positioned at the center of the swipe-to-preview interface 430 may be displayed to be larger and darker and the sticker contents at both sides may be displayed to be relatively smaller and lighter. Also, a size of sticker content displayed on the swipe-to-preview interface 430 and a size of the swipe-to-preview interface 430 may be adjusted according to a type of sticker content positioned at the center of the swipe-to-preview interface 430. When sticker content including an action is positioned at the center of the swipe-to-preview interface 430, the size of the sticker content including the action may increase. According to an increase in the size of the sticker content including the action displayed on the swipe-to-preview interface 430, the size of the swipe-to-preview interface 430 may also be expand.

An example in which swipe information is input in a left direction or a right direction is described. Here, without being limited to the left/right direction, the swipe information may be configured to be input in up (upper) and down (lower) directions. For example, swipe information may be input in the left direction or the right direction by a user 810. In response to the swipe information being input in the left direction from the user 810, sticker contents configured in the swipe-to-preview interface 430 may move in the left direction. In response to the swipe information being input in the right direction from the user 810, the sticker contents configured in the swipe-to-preview interface 430 may move in the right direction. For example, it is assumed that (N−2)-th sticker content (e.g., heart), (N−1)-th sticker content (e.g., trapezoid), N-th sticker content (e.g., rounded rectangle), (N+1)-th sticker content (e.g., rhombus), and (N+2)-th sticker content (e.g., star) are configured in the swipe-to-preview interface 430. For example, the (N−1)-th sticker content (e.g., trapezoid), the N-th sticker content (e.g., rounded rectangle), and the (N+1)-th sticker content (e.g., rhombus) may be displayed on the swipe-to-preview interface 430. For clarity of description, an example in which one sticker content is moved according to swipe information of the user and displayed on the swipe-to-preview interface 430 is described. In response to the swipe information being input in the right direction to the swipe-to-preview interface 430 from the user 810, the (N−2)-th sticker content (e.g., heart), the (N−1)-th sticker content (e.g., trapezoid), and the N-th sticker content (e.g., rounded rectangle) may be displayed on the swipe-to-preview interface 430. In response to the swipe information being input in the left direction to the swipe-to-preview interface 430 by the user 810, the N-th sticker content (e.g., rounded rectangle), the (N+1)-th sticker content (e.g., rhombus), and the (N+2)-th sticker content (e.g., star) may be displayed on the swipe-to-preview interface 430.

For example, a moving speed of sticker contents displayed on the swipe-to-preview interface 430 may be determined according to strength of the swipe information input from the user 810. That is, the swipe-to-preview interface 430 may be configured such that a browsing speed of sticker contents may be applied according to the strength of the swipe information input from the user 810. For example, when swipe information is quickly or forcefully input in the left direction or the right direction from the user 810, sticker contents displayed on the swipe-to-preview interface 430 may be quickly moved. In some example embodiments, when swipe information is slowly or weakly input in the left direction or the right direction from the user 810, sticker contents displayed on the swipe-to-preview interface 430 may be slowly moved.

A control instruction may be input for sticker content desired by the user 810 among sticker contents that are configured to move on the swipe-to-preview interface 430. Here, double tap information may be input as the control instruction of the user 810. For example, in response to the double tap information being input as the control instruction of the user 810 at the center of the swipe-to-preview interface 430, sticker content selected by the user may be transmitted to a chatroom of a message transmission and reception service.

Also, in response to double tap information being input as the control instruction of the user 810 around the center of the swipe-to-preview interface 430, movement to the auto-suggestion area 410 including sticker contents configured in relation to a keyword input from the user 810 may be performed. That is, the swipe-to-preview interface 430 may be terminated. In some example embodiments, a user interface for terminating the swipe-to-preview interface 430 may be provided at a specific location of the swipe-to-preview interface 430. For example, the user interface for terminating the swipe-to-preview interface 430 may be displayed at an upper right end of the swipe-to-preview interface 430. In response to a selection on the user interface for terminating the swipe-to-preview interface 430 displayed at the upper right end of the swipe-to-preview interface 430 from the user 810, the swipe-to-preview interface 430 may be terminated.

Figure 9:
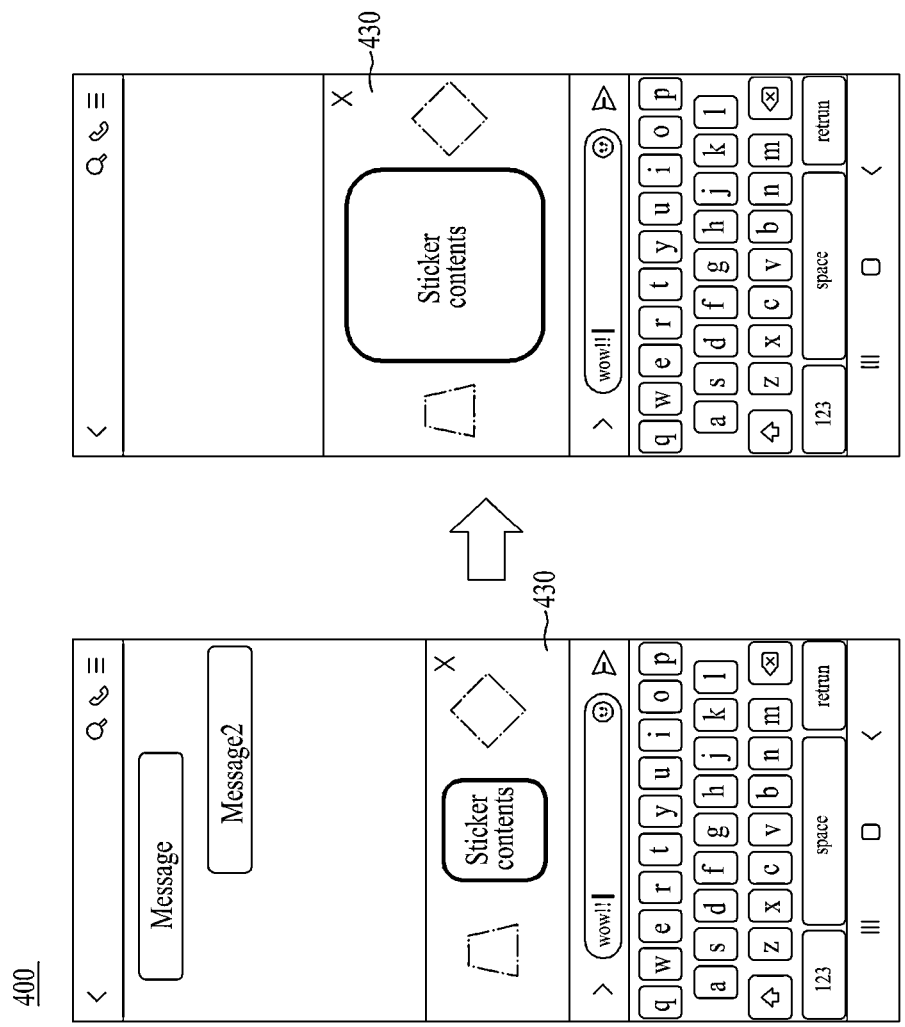
FIG. 9 illustrates an example of an operation of adjusting a size of a swipe-to-preview interface according to at least one example embodiment.

FIG. 9 illustrates an example of an operation of adjusting a size of a swipe-to-preview interface in a case that sticker content includes an action, according to at least one example embodiment.

The processor 220 may adjust the size of the swipe-to-preview interface 430 based on a type of sticker content corresponding to a location moved according to swipe information of a user. For example, the type of sticker content may include a sticker content, a sticker content including a text, and/or a sticker content including an action.

The processor 220 may set the size of the swipe-to-preview interface 430 to be maintained when the type of sticker content is the sticker content or the sticker content including the text and may set the size of swipe-to-preview interface 430 to expand by assigning an expansion effect to the swipe-to-preview interface 430 when the type of sticker content is the sticker content including the action. Here, the expansion effect represents that the size of the swipe-to-preview interface 430 is expanded. The user may recognize that the size of the swipe-to-preview interface 430 is being expanded.

When the type of sticker content is the sticker content including the action, the processor 220 may dynamically expand the swipe-to-preview interface 430 by size information set to correspond to a size of the sticker content including the action. For example, a process in which, in response to occurrence of the expansion effect, the swipe-to-preview interface 430 expands by a size set to correspond to a size of the sticker content including the action may be displayed. When sticker content corresponding to a location moved according to a control instruction of the user is the sticker content or the sticker content including the text rather than the sticker content including the action, the processor 220 may reduce the size of the expanded swipe-to-preview interface 430.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, and data structures. The program instructions recorded in the media may be specially designed and configured for the example embodiments or may be known to and available to those skilled in the computer software art. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of program instructions include a machine language code as produced by a compiler and a high-level language code executable by a computer using an interpreter.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The methods (as well as the computer devices) according to some example embodiments of the present disclosure provide a swipe-to-preview interface in response to a selection on one sticker contents configured in relation to a keyword input from a user, and enable the user to preview a subset of the sticker contents displayed on the swipe-to-preview interface and take an action within the preview screen, Thus, a dedicated user interface configured to allows a user to browse other sticker contents before transmitting a sticker content may be provided within a message, instead of automatically converting and delivering a sticker content corresponding to a specific keyword as in the conventional methods. Thus, there is no need for a user to perform additional operations to generate a preview screen including sticker contents, from which the user can select a sticker content different from the one initially recommended by the system, thereby consuming lesser computing resources and less power.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A sticker content browsing method performed by a computer device comprising at least one processor configured to execute computer-readable instructions included in a memory, the sticker content browsing method comprising:
by the at least one processor,
in response to receiving a keyword from a user, providing an auto-suggestion area configured to display sticker contents related to the keyword;
displaying the sticker contents related to the keyword on the auto-suggestion area;
in response to touch input being received from the user on a partial area of the auto-suggestion area or a sticker content among the sticker contents related to the keyword being selected by the user, providing a swipe-to-preview interface configured to enable the user to scroll the sticker contents related to the keyword without providing the auto-suggestion area; and
displaying a subset of the sticker contents related to the keyword in response to a control instruction of the user to the swipe-to-preview interface.

2. The sticker content browsing method of claim 1, wherein the displaying the subset of the sticker contents comprises displaying the subset of the sticker contents on the swipe-to-preview interface according to an order logic of the sticker contents related to the keyword configured in relation to the keyword input from the user.

3. The sticker content browsing method of claim 2, wherein the displaying the subset of the sticker contents comprises, in response to a selection of one sticker content among the subset of the sticker contents, displaying a previous sticker content of the selected one sticker content, the selected one sticker content, and a subsequent sticker content of the selected one sticker content in order on the swipe-to-preview interface.

4. The sticker content browsing method of claim 2, wherein, the displaying the subset of the sticker contents comprises displaying a specific one of the subset of the sticker contents that is positioned at a center of the swipe-to-preview interface to be highlighted rather than one or more of the subset of the sticker contents that are positioned at sides of the swipe-to-preview interface.

5. The sticker content browsing method of claim 2, wherein the displaying the subset of the sticker contents comprises, in a case that the subset of the sticker contents including a specific sticker content including a text, displaying the specific sticker content including the text to be smaller than one or more other sticker contents included in the subset of the sticker contents.

6. The sticker content browsing method of claim 2, wherein the displaying the subset of the sticker contents comprises, in response to sound being included in the sticker contents, providing a user interface configured to enable ON/OFF the sound.

7. The sticker content browsing method of claim 1, wherein the displaying the subset of the sticker contents comprises receiving swipe information as the control instruction of the user to the sticker contents displayed on the swipe-to-preview interface.

8. The sticker content browsing method of claim 7, wherein the displaying the subset of the sticker contents comprises moving a location of the sticker contents displayed on the swipe-to-preview interface according to the received swipe information and displaying a-corresponding ones of the sticker contents at the moved location.

9. The sticker content browsing method of claim 7, wherein the displaying the subset of the sticker contents comprises adjusting a size of the swipe-to-preview interface based on a type of a specific sticker content moved according to the received swipe information.

10. The sticker content browsing method of claim 9, wherein the type of the specific sticker content includes a first sticker content not including a text or an action, a second sticker content including the text, or a third sticker content including the action, and the displaying the subset of the sticker contents comprises,
setting the size of the swipe-to-preview interface to be maintained when the type of the specific sticker content is the first sticker content or the second sticker content, and
setting the size of the swipe-to-preview interface to expand by assigning an expansion effect to the swipe-to-preview interface when the type of the specific sticker content is the third sticker content including the action.

11. The sticker content browsing method of claim 9, wherein the displaying the subset of the sticker contents comprises dynamically expanding the swipe-to-preview interface by size information set to a size of the specific sticker content including an action when the type of the specific sticker content is a sticker content including the action.

12. The sticker content browsing method of claim 7, wherein the displaying the subset of the sticker contents comprises moving the sticker contents displayed on the swipe-to-preview interface by applying a browsing speed of the sticker contents according to strength of the received swipe information.

13. The sticker content browsing method of claim 1, wherein the displaying the subset of the sticker contents comprises, in response to double tap information being input as the control instruction of the user at a central area of the swipe-to-preview interface, transmitting a specific sticker content selected by the user.

14. The sticker content browsing method of claim 1, wherein the method further comprises,
in response to double tap information being input as the control instruction of the user at a central area of the swipe-to-preview interface,
terminating the swipe-to-preview interface; and
re-providing the auto-suggestion area configured to display the sticker contents related to the keyword.

15. A non-transitory computer-readable recording medium storing instructions that when executed by a processor, cause a computer device to perform a sticker content browsing method, the sticker content browsing method comprising:
in response to receiving a keyword from a user, providing an auto-suggestion area configured to display sticker contents related to the keyword;
displaying the sticker contents related to the keyword on the auto-suggestion area;
in response to touch input being received from the user on a partial area of the auto-suggestion area or a sticker content among the sticker contents related to the keyword being selected by the user, providing a swipe-to-preview interface configured to enable the user to scroll the sticker contents related to the keyword without providing the auto-suggestion area; and
displaying a subset of the sticker contents related to the keyword in response to a control instruction of the user to the swipe-to-preview interface.

16. A computer device comprising:
at least one processor configured to execute computer-readable instructions included in a memory,
wherein the at least one processor is configured to,
in response to receiving a keyword from a user, provide an auto-suggestion area configured to display sticker contents related to the keyword, display the sticker contents related to the keyword on the auto-suggestion area,
in response to touch input being received from the user on a partial area of the auto-suggestion area or a sticker content among the sticker contents related to the keyword being selected by the user, provide a swipe-to-preview interface configured to enable the user to scroll the sticker contents related to the keyword without providing the auto-suggestion area, and
display a subset of the sticker contents related to the keyword in response to a control instruction of the user to the swipe-to-preview interface.

17. The computer device of claim 16, wherein the at least one processor is configured to receive swipe information as the control instruction of the user to the sticker contents displayed on the swipe-to-preview interface and to display corresponding ones of the sticker contents at a location moved according to the received swipe information.

18. The computer device of claim 9, wherein the at least one processor is configured to adjust a size of the swipe-to-preview interface based on a type of a specific sticker content, from among the corresponding ones of the sticker contents, corresponding to the location moved according to the received swipe information.

19. The computer device of claim 18, wherein, when the type of the specific sticker content includes an action, the at least one processor is configured to dynamically expand the swipe-to-preview interface by size information set to a size of the specific sticker content including the action.

* * * * *